Nov. 6, 1962
B. L. BAXTER
3,062,336
TOWER
Filed July 1, 1959
7 Sheets-Sheet 1
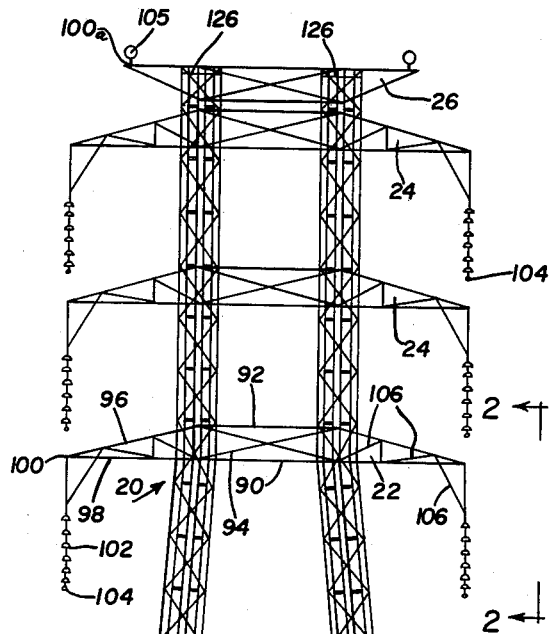
FIG. 1
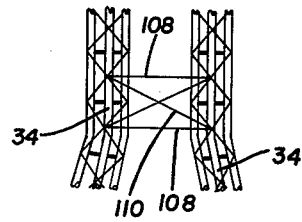
FIG. 3
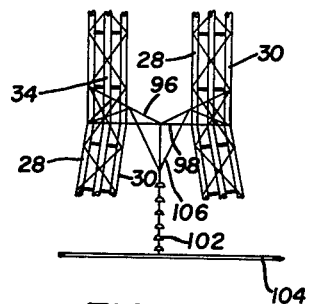
FIG. 2
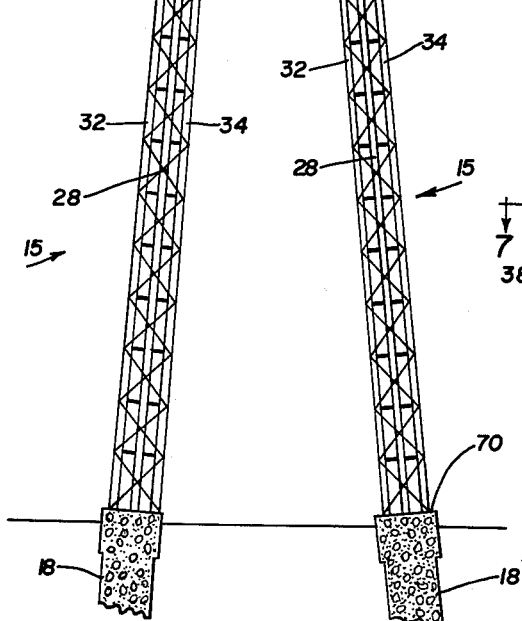
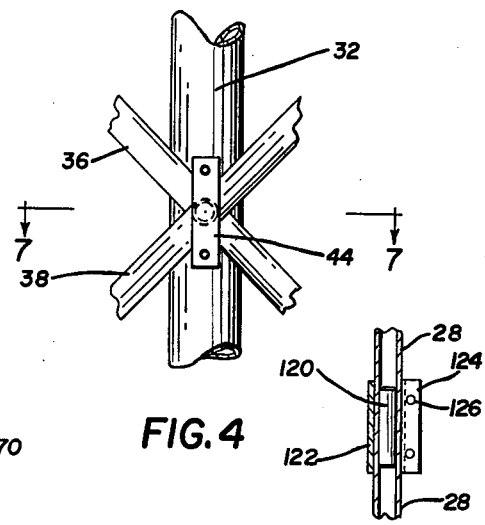
FIG. 4
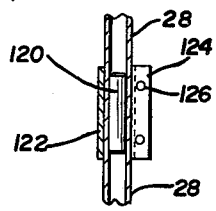
FIG. 5
INVENTOR.
BRUCE L. BAXTER
BY *Glenn & Jackson*
ATTORNEYS Nov. 6, 1962  B. L. BAXTER  3,062,336
TOWER
Filed July 1, 1959  7 Sheets-Sheet 2
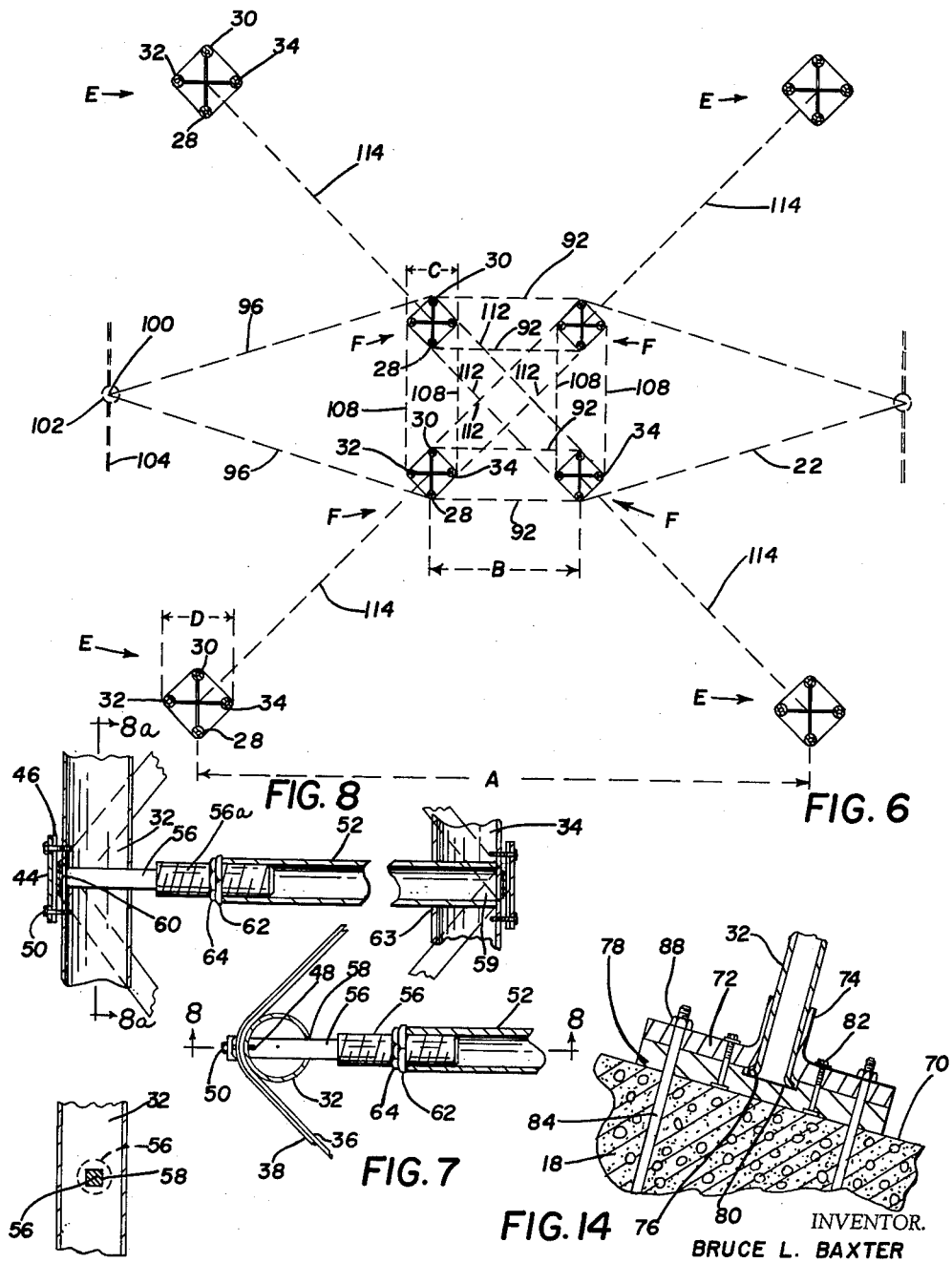
INVENTOR.
BRUCE L. BAXTER
BY Glenn & Jackson
ATTORNEYS Nov. 6, 1962   B. L. BAXTER   3,062,336
TOWER
Filed July 1, 1959   7 Sheets-Sheet 3

INVENTOR.
BRUCE L. BAXTER
BY Glenn & Jackson
ATTORNEYS

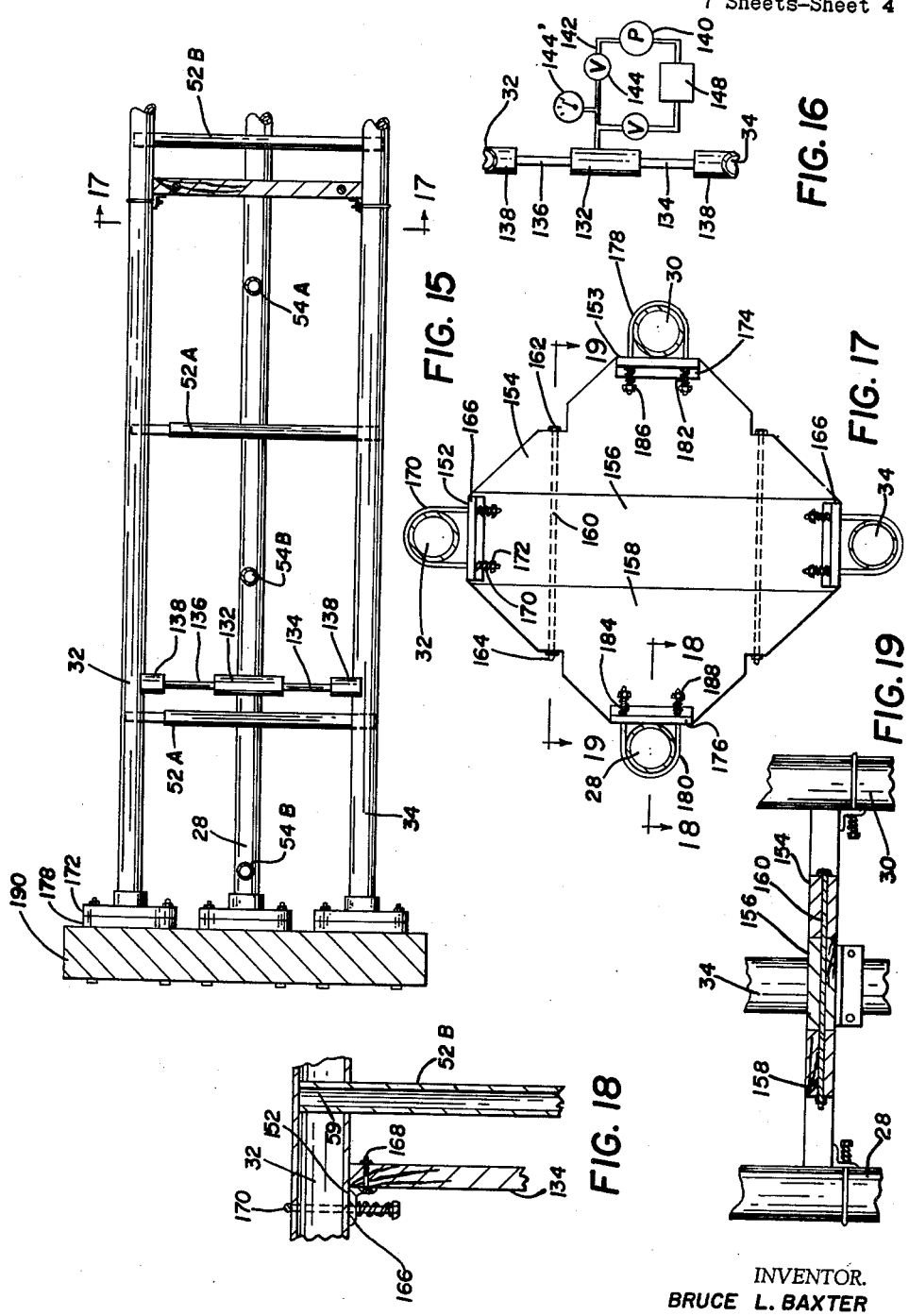

Nov. 6, 1962     B. L. BAXTER     3,062,336

TOWER

Filed July 1, 1959     7 Sheets-Sheet 5

INVENTOR.
BRUCE L. BAXTER
BY Glenn & Jackson
ATTORNEYS

Nov. 6, 1962     B. L. BAXTER     3,062,336
TOWER
Filed July 1, 1959     7 Sheets-Sheet 6
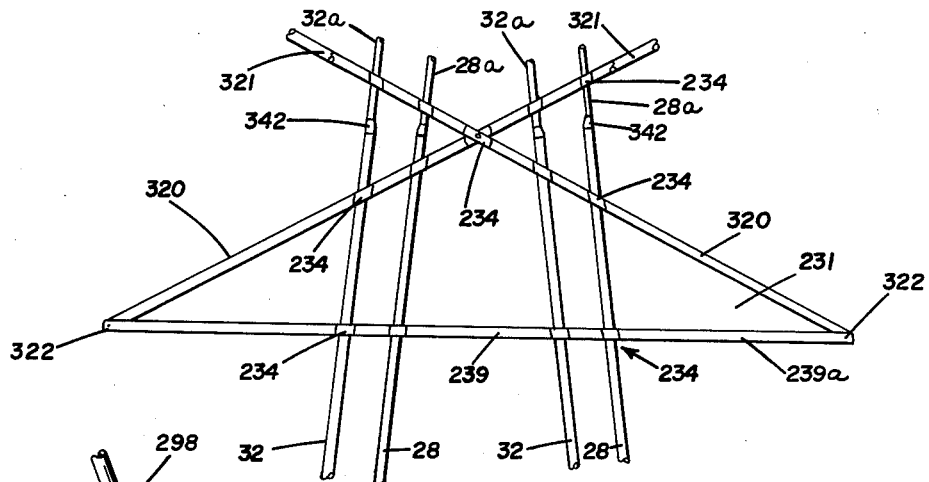
FIG. 22
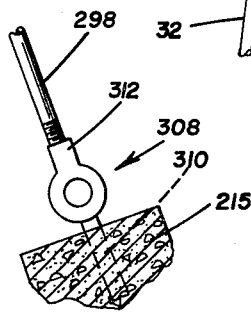
FIG. 42
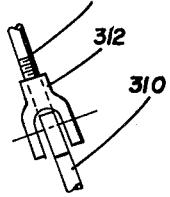
FIG. 43
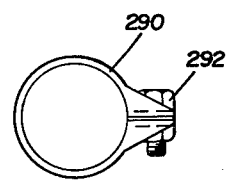
FIG. 40
FIG. 41
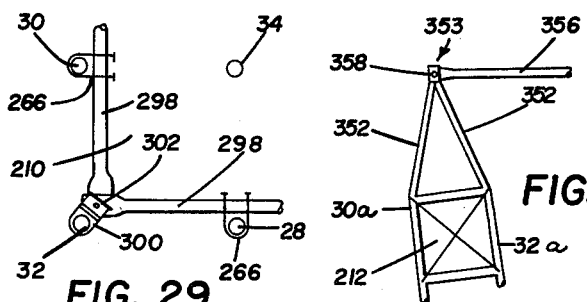
FIG. 29    FIG. 25
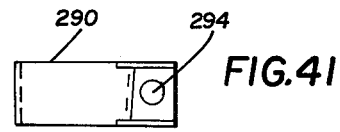
FIG. 39
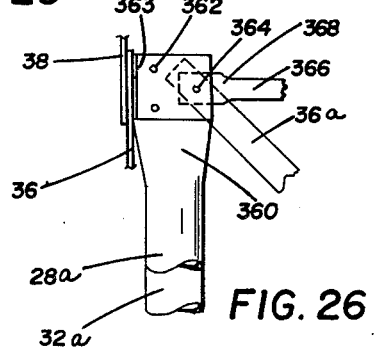
FIG. 26
INVENTOR.
BRUCE L. BAXTER
BY *Glenn & Jackson*
ATTORNEYS Nov. 6, 1962 B. L. BAXTER 3,062,336
TOWER
Filed July 1, 1959 7 Sheets-Sheet 7

INVENTOR.
BRUCE L. BAXTER
BY Glenn & Jackson
ATTORNEYS

United States Patent Office 3,062,336
Patented Nov. 6, 1962

3,062,336
TOWER
Bruce L. Baxter, Louisville, Ky., assignor to Reynolds Metals Company, Richmond, Va., a corporation of Delaware
Filed July 1, 1959, Ser. No. 824,436
8 Claims. (Cl. 189—19)

Towers of various kinds, and particularly transmission towers and the lines supported thereby are continuously exposed to the action of wind, snow, rain, sun and similar hazards which tend to corrode and collapse the towers and break the electric transmission lines. Towers sometimes must support spans of electric lines of very long distances. The lines carry high tension currents. The lines are arteries of power relied upon by large numbers of industries and communities. Hence, failure of breakage of a power line involves serious consequences.

Steel is used as a main structural element in many of these towers. Such towers are expensive in upkeep, since they must be frequently treated against corrosion. However, there are always vulnerable and inaccessible places where such treatment is ineffective, such as at sharp corners, bolt holes and intersecting surfaces. Hence, such towers are subject to unexpected failure and ordinarily must be replaced relatively frequently.

When the design of steel towers is attempted to be copied with the use of aluminum as the basic material, the cost of such a tower is prohibitive, because it is necessary to use too much aluminum to compensate for the difference in strength, weight and cost per pound between steel and aluminum.

According to this invention, however, the shape and design of the towers are changed in a manner to permit the use of aluminum as the basic metal material without substantially increasing the cost of the towers, and thus provide towers which are substantially non-corrosive and not subject to the relatively rapid deterioration of steel towers.

Hence, it is among the objects of this invention to provide non-corrosive towers, in which all of the structural members are made of non-corrosive aluminum (the word "aluminum" is used herein to include commercial aluminum, suitable non-corrosive aluminum alloys, suitable non-corrosive aluminum-like metals and/or non-corrosive alloys), and in which the shape and construction of the towers permit the final cost of the towers to be competitive with steel towers, notwithstanding the higher cost of aluminum compared to steel.

Another object of this invention is to provide an aluminum tower which advantageously uses the "galling" or slippage resistance effect between aluminum members to provide simplified structures and to permit an effective construction properly to tension the bracing members.

Another object of this invention is to provide aluminum upright tower units or legs in which a plurality of upright aluminum members or tubes are placed in spaced relationship with aluminum tension members or bands wound in opposed spirals turning around the outer surface of said tubes and intersection each other and said tubes to produce spans between said tubes, and in which legs cross-bars are provided between such tubes in a manner that the lengths of such cross-bars are adjustable to adjust the tension of each of the spans of the bands.

Another object of this invention is to provide a tower according to the preceding object in which the tension members are in the form of bands.

Another object of this invention is to use the galling effect of adjacent aluminum members to prevent slippage between the foregoing bands and tubes.

Another object of this invention is to provide improved footer constructions for such towers.

Another object of this invention is to provide new and useful methods and apparatus for assembling the legs of the towers which permit major portions of such legs to be assembled on the ground or in substantially level condition and then to be elevated in upright position on the footers of the tower.

Another object of this invention is to provide methods and apparatus according to the foregoing object in which a fluid pressure jack construction or the like and/or a collapsible jig construction is or are used for assembling the legs of the towers.

Another object of this invention is to assemble the legs of the tower in a manner to provide added strength and bracing ability to the tower.

Other objects and advantages will become apparent as the description proceeds with reference to the accompanying drawings, in which:

FIGURE 1 is a diagrammatic elevation of a tower embodying my invention.

FIGURE 2 is a transverse elevation of a portion of FIGURE 1 looking from the line 2—2 of FIGURE 1, and with certain parts omitted to avoid confusion.

FIGURE 3 is a representative view, somewhat similar to FIGURE 2, but showing the legs and the cross-bracing which may be used in addition to the cross-bracing indicated in FIGURES 1 and 2.

FIGURE 4 is an enlarged elevation of the intersection of the bands and upright tube.

FIGURE 5 is a vertical cross-section of a joint between the ends of the upright tubes.

FIGURE 6 is a diagrammatic cross-section taken horizontally near the base of the tower for the outer parts of FIGURE 6 and near the level of the lowest cross-arm for the central portion of FIGURE 6.

FIGURE 7 is a horizontal cross-section along the line 7—7 of FIGURE 4.

FIGURE 8 is a vertical cross-section taken along the line 8—8 of FIGURE 7.

FIGURE 8a is a vertical cross-section taken along the line 8a—8a of FIGURE 8.

FIGURE 14 is an enlarged cross-section of a portion of FIGURE 13.

FIGURE 15 is a diagrammatic representation of a method and apparatus for assembling the legs of the tower.

FIGURE 16 is a diagrammatic representation of a fluid pressure jack construction for use with FIGURE 15.

FIGURE 17 is an enlarged cross-section taken along the line 17—17 of FIGURE 15.

FIGURE 18 is a cross-section along line 18—18 of FIGURE 17.

FIGURE 19 is a cross-section along line 19—19 of FIGURE 17.

FIGURE 22 is an enlarged diagrammative elevation of a portion of FIGURE 20.

FIGURE 25 is an enlarged detail of a portion of the top of FIGURE 21.

FIGURE 26 is an enlarged detail of the juncture of certain members at the point 226 in FIGURE 20.

Figure 20:
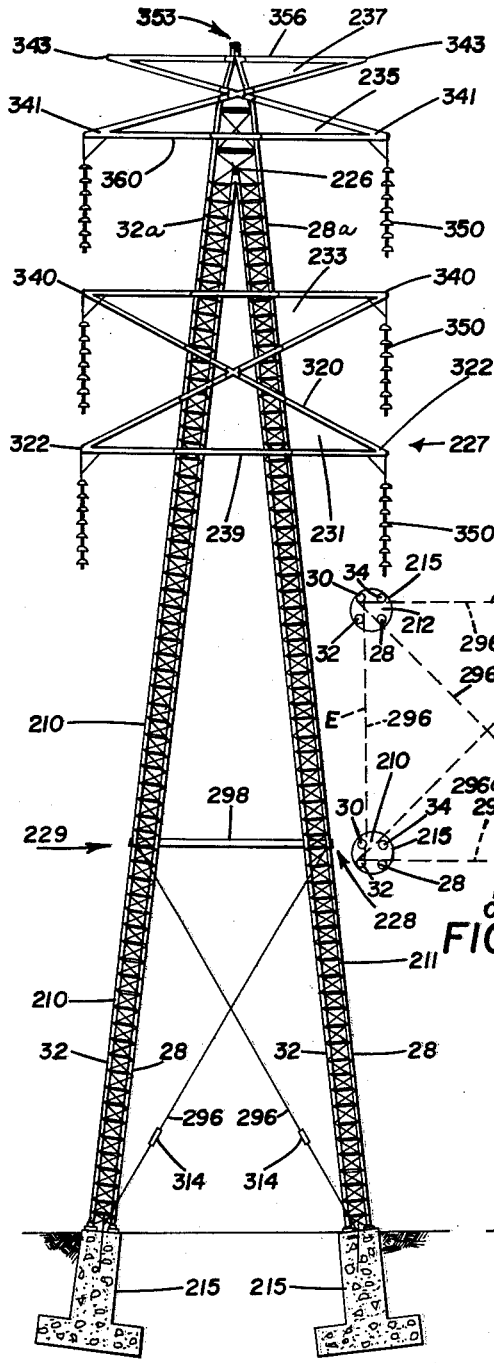
FIGURE 20 is a diagrammatic elevation of another embodiment of the tower viewed from the side C of FIGURES 23 and 44.

FIGURE is an enlarged detail of certain members at the point 228 in FIGURE 20.

FIGURE 29 is an enlarged detail of certain members at the point 229 in FIGURE 20.

Figure 30:
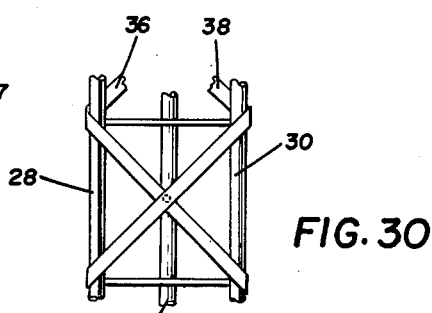

FIGURE 30 is an enlarged typical elevation of a portion of a leg of the towers and showing only two of the four tension bands.

Figure 31:
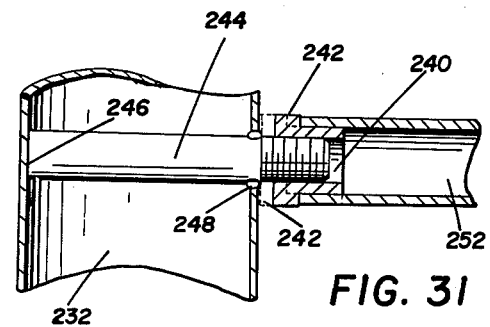

FIGURE 31 is an enlarged cross-section of one end of another embodiment of a diagonal cross bar similar to cross bar 52.

Figures 32, 33:
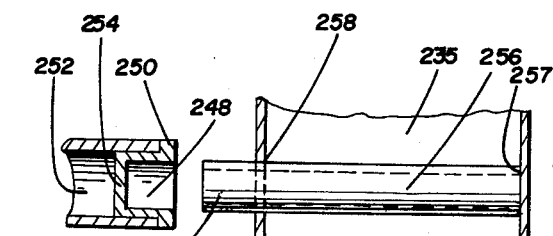

FIGURE 32 is a cross-section of the other end of the cross bar of FIGURE 31 or another embodiment of an end of any of the cross bars herein disclosed.

FIGURE 33 is a cross section of a portion of an upright tube and a horizontal tube to receive the end of the cross bar shown in FIGURE 32.

Figures 34, 35, 36:
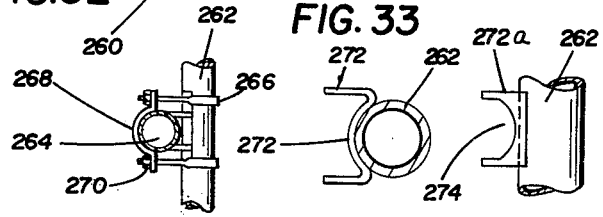

FIGURE 34 is an enlarged horizontal cross-section of a typical clamp such as shown at 234 in FIGURE 22.

FIGURE 35 is a diagrammatic tranverse cross-section of a portion of FIGURE 34.

FIGURE 36 is a diagrammatic elevation of FIGURE 35.

Figure 37:
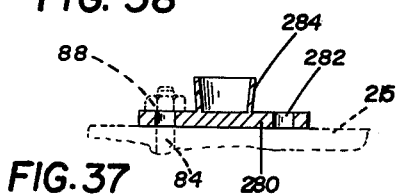
Figure 24:
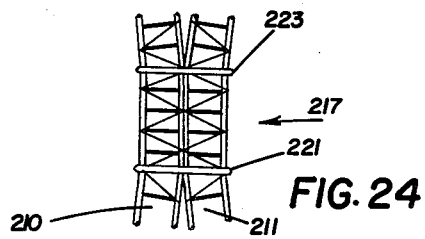
FIGURE 24 is an enlarged elevation of a portion of FIGURE 21 with an added band to secure the legs together.

FIGURE 37 is a vertical cross-section of another embodiment of a portion of a footer construction.

Figure 38:
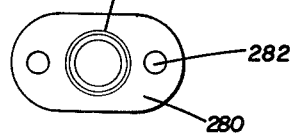

FIGURE 38 is a plan view of FIGURE 37.

FIGURE 39 is an elevation, with parts broken away, of the footer construction of FIGURE 37, in reduced scale.

FIGURE 40 is a plan view of the clamp of FIGURE 39 slightly enlarged.

FIGURE 41 is an elevation of the clamp of FIGURE 40 with the bolt omitted.

FIGURE 42 is a diagrammatic detail of portions of a clevis connection for connecting the lower end of the guy wires to the footer constructions.

FIGURE 43 is a view of a portion of FIGURE 42 and transverse thereto.

Figure 21:
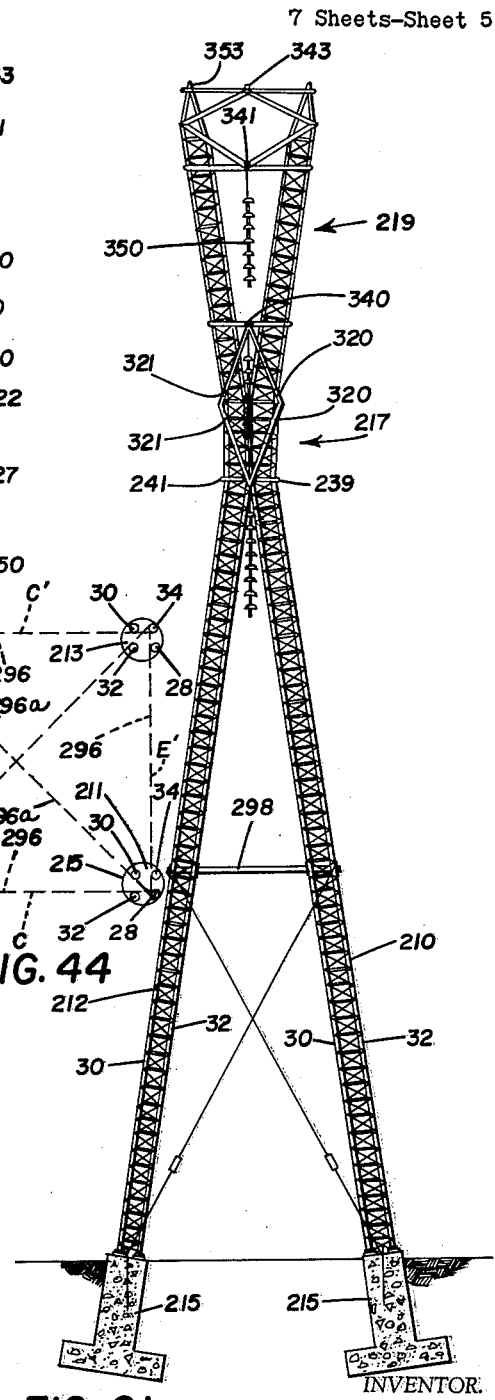
FIGURE 21 is a diagrammatic elevation transverse to FIGURE 20 viewed from side E of FIGURES 23 and 44.

FIGURE 44 is a diagrammatic plan view of the footers for the towers of FIGURES 20 and 21.

In the embodiment of the invention shown in FIGURES 1, 2, 3 and 6 the tower includes a plurality, such as four, generally upright units or legs 15. These legs are supported at their lower ends by footers 18, and converge upwardly toward each other until they reach their closest approach to each other at or near the level 20 near the lowest electric line support cross-arm 22. Thereafter, the legs 15 may continue upwardly in parallel relationship to the top of the tower. Other electric line support cross-arms 24 and 26 may be provided.

Figures 9, 10, 11, 12, 13:
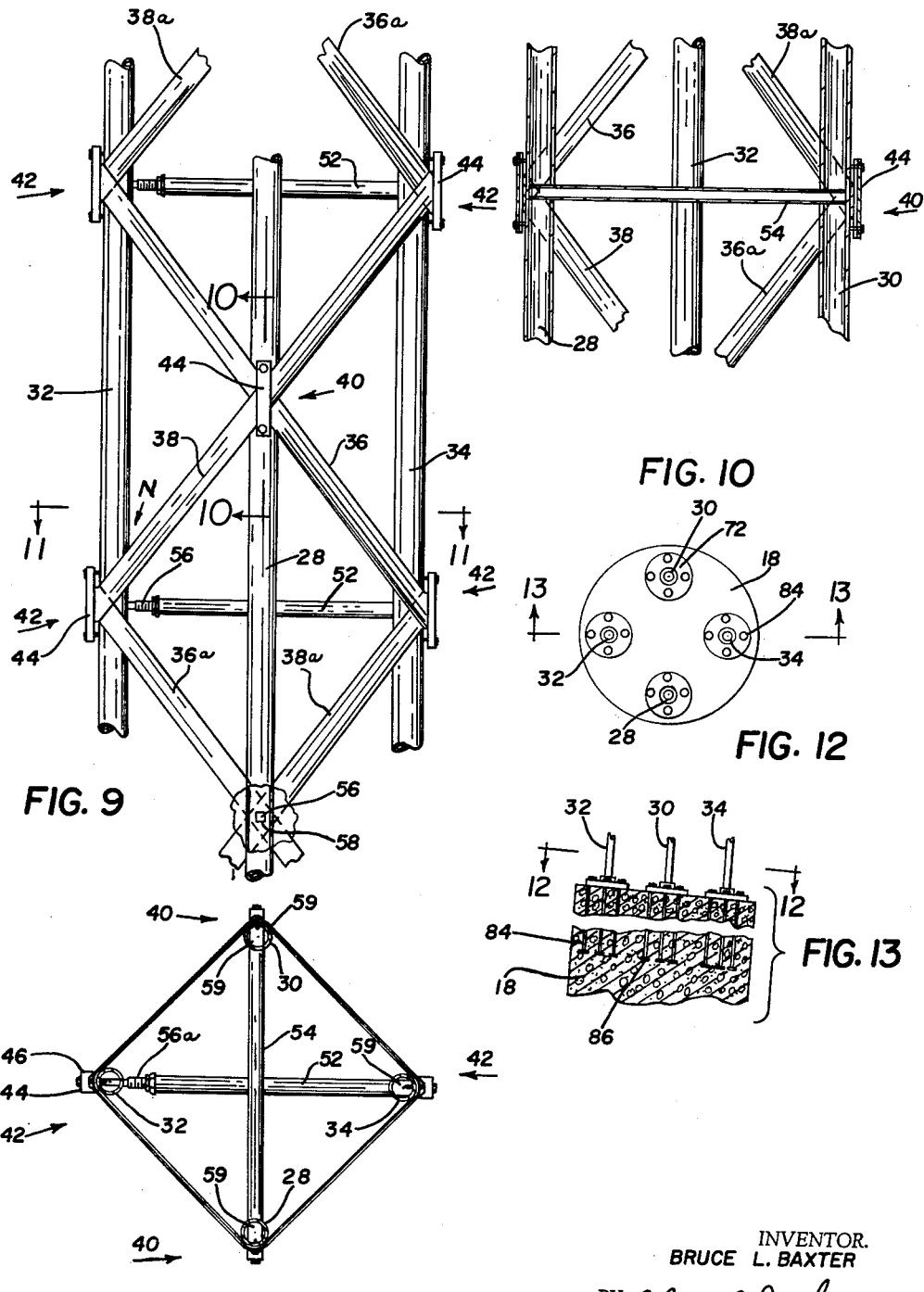
FIGURE 9 is an enlarged elevation of a portion of one of the upright legs.
FIGURE 10 is a cross-section taken along the line 10—10 of FIGURE 9.
FIGURE 11 is a horizontal cross-section taken along the line 11—11 of FIGURE 9.
FIGURE 12 is a cross-section of the footer taken along line 12—12 of FIGURE 13.
FIGURE 13 is a vertical cross-section along line 13—13 of FIGURE 12.

The legs 15 include a plurality of upright aluminum members or tubes 28, 30, 32 and 34. The tubes or tubular members 28 and 30 are a pair of diagonally opposed substantially upright tubes, and the tubes or tubular members 32 and 34 are another pair of diagonally opposed substantially upright tubes arranged in diamond or square cross-sectional relationship, as shown in FIGURE 11. Two pair of aluminum tension members or bands 36, 38, and 36a, 38a are wound in opposed spirals circling around the outer parts of the outer surfaces of the tubes 28, 30, 32 and 34. These bands intersect each other at substantially equal intervals to form intersections 40 and 42 with each other and with the tubes 28—34. The intersections 40 with the pair of tubes 28 and 30 are in equal vertical staggered relationship with the intersections 42 of the other pair of tubes 32 and 34.

Means are provided for securing the bands 36, 38 and 36a, 38a to the upright tubes 28—34 at the intersections 40 and 42. To this end, clamping plates 44, with vertical teeth 46, are pulled toward the tubes by means of the screws 48, which may have square or hexagonal heads at 50. The plates 44 clamp and squeeze the bands 36, 38, 36a and 38a against each other and against the tubes 28—34. The galling action of the aluminum bands 36, 38, 36a and 38a, the tubes 28—34, and the clamps 44 securely holds these parts from slipping with respect to each other, since the aluminum surfaces have an anti-slipping, or galling, action when tightly held together. As will become apparent, this galling action is used advantageously in tensioning the courses or spans of the bands 36, 38, 36a and 38a between the intersection 40 and 42.

Means are provided for imposing a tensioning force on the bands, 36, 38, 36a and 38a. Such means includes, for example, diagonal cross-bars 52 and 54 extending between the tubes 32 and 34 and the tubes 28 and 30, respectively. Means for adjusting the length of the bars 52 and/or 54 are provided, so these bars can push the intersections 42 and/or 40 outwardly to produce the desired tension on each of the spans of the bands 36, 38, 36a and 38a properly to brace the upright legs of the tower. The bars 52 and 54 are shown with such means to adjust the length at proper positions to produce the proper tension on each span of the bands 36, 38, 36a and 38a.

Means for adjusting the lengths of some or all of the bars 52 and/or 54, in the embodiment of FIGURE 7, 8 and 8a, may include an insert or bolt 56, 56a. The square cross-sectioned portion 56 extends into the square hole 58 in the selected vertical tube, such as tube 32, and its end bears against the inner surface of the tube 32 or other selected tube. The threaded cylindrical portion 56a of the integral bolt 56, 56a extends slidably and snugly in the internally smooth end of the tube 52 or 54. The nut 62 is turned to exert the required outward pressure on the bolt 56, 56a properly to tension the adjacent spans of the bands 36, 38, 36a and 38a. A lock nut 64 is then turned to lock the nut 62 in place. The bolt 56, 56a cannot turn while the nuts 62 and 64 are being turned because of the square (hexagonal or other) cross-section of the bolt portion 56 and hole 58. The other end 59 of the bar 52 or 54 (as the case may be), extends loosely through a hole 63 in the upright tube 34 (or 30) and has its end surface properly rounded to bear on a large part of the inner surface of the tube 34 (or 30). The bars 54 extend through similar holes in the upright tubes 28 and 30 and have properly rounded ends to bear against large areas of the inner surfaces of the tubes 28 and 30.

It is not necessary that every bar 52, 54 be adjustable in length. It is sufficient if enough of the bars 52 and/or 54 are adjustable in length properly to tension every span of the bands 36, 38, 36a and 38a. FIGURE 15 diagrammatically illustrates assembly of a typical leg in which bars 52A and 54A are adjustable in length in the manner just described. The bars 52B and 54B, in FIGURE 15, are not adjustable in length and have both ends similar to end 59 in FIGURE 8 so there is no lengthwise adjustment at either end. The arrangement of FIGURE 15 may be continued with as many non-adjustable bars as possible while providing proper tension for every span of the bands 36, 38, 36a and 38a. The particular arrangement shown in FIGURE 15 is particularly advantageous when using the apparatus and method of assembly later to be described.

In another arrangement, all of the bars 52 are made adjustable in length while the bars 54 are not adjustable. In a converse arrangement, all of the bars 54 are adjustable in length and the bars 52 are not adjustable in length. Also, all of the bars 52 and 54 may be adjustable in length, if desired. Any of the foregoing arrangements insures that all of the spans of the bands are properly tensioned.

During assembly of bars 52 and 54 within the legs 15, the nuts 62 and 64 are turned longitudinally leftward on the threaded bolt portion 56a a sufficient distance so the portion 56a can be pushed sufficiently far into the tubes 52 or 54 to permit the end 60 of the square portion 56 to swing back and forth past the hole 58 after the end 59 has been inserted into the hole 63. The end 60 is then aligned with the hole 58 and is inserted therein and the nuts 62 and 64 are turned longitudinally rightward to drive the ends 59 and 60 tightly outward against the insides of the tubes 32 and 34 or 28 and 30, as the case may be.

The bands 36, 38, 36a and 38a may be wound around the tubes 28—34 at any desired vertical angle with respect to each other. For example, the vertical angle N between the tube 32 and the band 38 may be 45° or any other desired angle and the other tubes and bands may have corresponding or matching vertical angles. However, the angle 45° is preferred, since it coincides with the direction of the stresses, and causes the bands to be an integral part of the supporting structure.

To aid the galling action at the intersections 40 and 42, the surfaces of the tubes 28—34 and bands 36, 38, 36a and 38a are made rough, as by the use of sand paper or the like, along the surfaces which form the intersections.

Footers 18 may be of proper size and depth, and may be made of concrete. The upper surface 70 of each footer is finished at right angles to the axis of the leg 15 to be supported by the respective footer. The lower ends of the tubes 28—36 are secured to the footers 18 by any suitable means or construction. For example, a plate 72 is provided for the lower end of each tube 28—34. FIGURE 14 shows the details applied to the tube 32, but duplicate parts are used for the ends of tubes 28, 30 and 34. The plate 72 has an upward sleeve 74 to receive the end of tube 32, which tube passes down through plate 72 and is flared outwardly at 76 sufficiently to insure that the tube 32 cannot be pulled out by the stresses on the tower. A second plate 78 has a countersunk portion 80 to receive and hold the flare 76, and is bolted to plate 72 at 82. A proper number of bolts 84, such as four, with heads or other offsets 86, are grouted in the footer 18 and receive the preformed holes in the plates 72 and 78. The plates are held in place by the internally threaded nuts 88. Each footer tightly holds the lower ends of the tubes 28—34. Sufficient grounding of the tubes 28—34 is provided at the footers and bolts 84, in a well-known manner.

Proper electric line supporting cross-arms 24 and 26 may be secured to the tower. These cross-arms may be made of aluminum bars bolted or otherwise secured to each other and to the tubes 28 and 30, for example. Two pairs of horizontal bars 90 and 92 may be secured to the tubes 28 and 30, for each cross-arm. The cross-arms preferably are secured to the tower at and above the point where the units 15 have been directed upwardly in parallel relationship. Cross-bracing bars 94 may be secured to the ends of the bars 90 and 92 and/or the tubes 28 and 30. Pairs of cantilever bars 96 and 98 may be secured at the tubes 28 on one side of the tower and to the tubes 30 on the other side of the tower, and the bars 96 and 98 may converge and join at the point 100 where they support the insulators 102 and lines 104. The cross-arm 26 may be similarly constructed, as is evident, and conveniently may have its members extend to the point 100a. The cross-arm 26 may support the ground wires or lines 105 as indicated. Truss bracing for the cantilever portions may be provided, as at 106, etc.

Additional cross-bracing may be provided in the tower wherever required. For example, as shown in FIGURES 3 and 6, horizontal cross-bracing members 108 and diagonal cross-bracing members 110 may be secured to pairs of tubes 34 and/or 32 at or adjacent each or any cross-arm 24 and 26. FIGURE 3 is substantially the same view as FIGURE 2, except that FIGURE 3 omits the cross-arm details whereas FIGURE 2 omits most of the cross-bracing details, for the sake of clearness. Diagonal horizontal and vertical diagonal cross-bracing may also be provided as indicated by the dotted lines 112 in FIGURE 6.

The legs 15 may converge upwardly from the level of the tops of the footers 18 to the level of the lowest cross-arm 22. Also, the tubes 28—34 within each leg 15 may also converge between these two levels. This is indicated in FIGURE 6, wherein the larger cross-sections E of the legs 15 are taken at or adjacent the tops of the footers 18, and the smaller cross-sections F of the legs in FIGURE 6 are taken at or adjacent the level of the lowest cross-arm 22. The legs 15 preferably continue upwardly in a substantially vertical direction and without any convergence of the legs 15 or tubes 28—34 above the level of the lowest cross-arm 22.

In FIGURE 6, the convergence of the axes or centerlines of the legs 15 is indicated by the dotted lines 114. The distance between the centers of the legs 15 at the footer level is indicated by the line A, which, in one typical tower, may be 20 feet. The distance between the centers of the units at the level of the lowest cross-arm 22 is indicated by the line B, which, in this instance, may be five feet. The distance D between the diagonally opposite tubes at the lower level may be 2.5 feet and the corresponding distance C at the upper level may be 1.5 feet. In the typical tower in this instance, which is used as an example, and not as a limitation, the tubes 28—34 may be 3.5 inches outside diameter and of .102 inch wall thickness. The bars 52 (the large part of the tube) and 54 may be 1¼ inches outside diameter and .140 wall thickness. The bands 36, 38, 36a and 38a may be 2¼ inches wide and .102 inch thick. All of these members, and all other members ordinarily made of metal, such as nuts, bolts, etc., are made of aluminum, in this type of tower. In the tower specifically disclosed, the distance from the footers 18 to the level of the lowest cross-arm 22 may be from 50–60 feet, with a total height of tower of from 80–90 feet.

The legs of the tower illustrated in FIGURE 6 converge at a relatively more rapid rate than the legs illustrated in FIGURE 1.

Sections of the tower are made as long as practicable, but when the tubes 28—34 require "splicing" this may be accomplished as shown in FIGURE 5. Two ends of tubes 28 (or 30, 32 or 34) are joined by an internal insert, bar or tube 120. This insert 120 is secured in the ends of tubes 28 by differential thermal contraction and/or expansion. For example, the insert 120 is cooled, or "frozen" in solid $CO_2$ and is then inserted in the ends of the tubes 28, for example, which are at atmospheric temperature. When "frozen," the insert 120 is just small enough in cross-section to fit in the tubes 28—34, so when the insert heats to normal temperature, the insert expands tightly and firmly in place. If desired, the insert 120 is first secured to the end of one tube 28 by this method and the such tube and member are then secured to the end of the other tube 28 by first cooling the first tube end and insert.

A sleeve 122 may be placed around the ends of tubes 28. The sleeve 122 may have flanges 124 at its side edges which are clamped together by bolts 126 to tighten the sleeve 122 around the ends of tubes 28—34.

The tubes 28—34, etc. have been shown with circular cross-section. Such tubes may also be made with a hexagonal or other cross-section by means of a brake press, using aluminum sheet or coil stock.

Horizontal bands, such as band 126, may be wrapped around the top, and bottom if desired, of the legs 15, and they may be secured to the tubes 28—34 substantially the same as bands 36, etc. Diagonal bars, similar to bars 52 and 54, but adjacent each other, may be attached to the tubes 28—34 inside such band or bands 126. Such construction maintains the top, and bottom if desired, in rigid and non-collapsible condition.

Substantially all of the tower members may be assembled at or near the site of erection, if desired. Alternatively all or some sections of the tower may be assembled at a conveniently located factory and may be transported to the site of erection when transportation facilities permit.

The main components of the entire tower consist of two simple standard mill products, aluminum tubular extrusions and aluminum coil stock, which can be erected in the field, if desired, in a horizontal position, and then raised into full position and fastened to the foundations.

While some of the features herein shown and described are particularly useful in connection with aluminum towers, such features are also useful in connection with other structures made either of aluminum or of other metals, and come within such purview unless otherwise specifically limited in the claims.

Towers and other structures may also be made which include only one, two, three or more legs 15, when desired. Also the tubes 28—34 may be tapered toward each other or they may be parallel throughout the leg or legs, as desired.

In construction, each leg or unit 15 may be assembled "on the ground" i.e., horizontally, and preferably near the site of installation. The bands 36, 38, 36a and 38a may be wrapped spirally "up" each leg 15, in helical fashion, starting at the "bottom" of the leg 15 from opposite tubes 28 and 30 or 32 and 34. Each band in each pair of bands 36, 38 and 36a, 38a is wound spirally in opposite spiral direction to the other band of such pair. The tubes 28—34 and bars 52, 54 are preliminarily assembled in any desired manner to permit the wrapping of the bands 36, 38, 36a and 38a. The tensioning of the bands by means of the nuts 62, 64 may be performed at any desired stage in the construction.

FIGURES 15–19 show diagrammatically a method and apparatus for assembling the legs 15 horizontally or "on the ground" near the site where the tower is to be erected. The bars numbered 52B and 54B in FIGURE 15 have a cross-section similar to the bar 54 in FIGURE 10. That is, bars 52B and 54B have both ends devoid of length adjusting means, and are cylindrical or uniformly tubular throughout their lenghts. The bars 52A and 54A of FIGURE 15 have one end provided with the length adjusting means shown in FIGURES 7, 8 and 8a, and the other end like end 59, FIGURE 8.

The tubes 28—34 are assembled on a plurality of collapsible jigs 130 with the bars 52A, 54A, 52B and 54B in the proper openings in tubes 28—34, corresponding to openings 58 and 69 of FIGURES 7, 8, and 8a, as required by the character of the bars being used. That is, the openings in tubes 28—34 provided for one end of bars 52A and 54A are like square openings 58 of FIGURE 8a and the openings for the other end of these bars are circular, like opening 63 of FIGURE 8. The openings provided for both ends of bars 52B and 54B are circular, like the circular openings 63 shown in FIGURE 8.

The jigs 130 may be made of wood, plastic, or any other material and have flat corners 152 and 153 to receive the tubes 28—34 substantially at, or very slightly less than, the correct distance apart which they will have in final assembled condition. The bars 52B and 54B have been previously inserted in the tubes 28—34 and are ready to space such tubes the correct diagonal distance apart. The bars 52A and 54A have been previously inserted in the tubes 28—34, but are slightly shorter than final length, because the nuts 62 and 64 are slightly leftward (with reference to FIGURES 7 and 8) of their final position.

The unadjustable bars 52B and 54B occur with sufficient frequency along the length of the leg being assembled so that all the tubes 28—34 will be correctly diagonally spaced apart when the bands 36, 38, 36a and 38a are wound around the tubes 28—38 (starting at one end) the bands being wound as tightly as practically possible. Thereafter such bands are secured to the tubes by the use of the clamping plates 44 heretofore described.

Thereafter the bars 52A and 54A are adjusted lengthwise to impose the correct tension on the spans of the bands 36, 38, 36a and 38a. To this end, according to FIGURES 15 through 19, one or more spreading means, such as shown in FIGURE 16, are used serially or simultaneously to spread the tubes 28—34 adjacent the bars 52A and 54A to substantially the correct position to impart the correct tension on the adjacent spans of the bands 36, 38, 36a and 38a. Then the bars 52A and 54A, which are adjacent the spreading means, are adjusted lengthwise by turning the nuts 62 rightward (with freference to FIGURES 7 and 8) so the ends 59 and 60 of such bars 52A and 54A are snugly against the inner surfaces of the respective opposed tubes 28—34. Then the spreading means are released and the nuts 62 (and lock nuts 64) may then be given a final turn to calibrate the tension of the bands to the final desired degree. After all of the bars 52A and 54A have been correctly adjusted in this manner, the spreading means and the collapsible jigs are removed from the completed leg which is then ready to be hoisted to the place of installation.

The spacing of the bars 52A, 54A, 52B and 54B along the leg should be such that at least one adjustable bar 52A and/or 54A is adjacent every span of the bands 36, 38, 36a and 38a. Also the spacing of the unadjustable bars 52B and 54B should be such that they occur with sufficient frequency along all of the tubes 28—34 to insure proper diagonal spacing all along the length of all of said tubes while the bands 36, 38, 36a and 38a are being wound around the tubes. One example of such spacing has been illustrated in FIGURE 15, in which at least one adjustable bar 52A or 54A is placed adjacent every span of said bands. Likewise the unadjustable bars 52B and 54B occur with sufficient frequency to insure correct diagonal spacing throughout the length of all of the tubes 28—34.

The spreading means shown in FIGURES 15 and 16 may be, for example, somewhat like a fluid pressure or hydraulic jack having a fluid piston and cylinder chamber 132, plunger rod 134, stationary or plunger rod 136, and tube engaging heads 138 to engage the tubes 28—34 along a sufficiently large area to insure that the tubes 28—34 do not collapse when pressure is applied. Fluid or liquid under pressure from a pump 140 or the like is fed through the pipe 142 and valve 144 to the cylinder 132 until the pressure gauge 144' indicates that the correct pressure has been applied to the respective tubes 28—34 to produce the desired tension on the tension bands 36, 38, 36a, 38a. The nuts 62 (and 64) are then adjusted, as previously described. Thereafter the valve 144 may be closed and valve 146 may be opened (from its previous closed position) to return sufficient liquid to the reservoir 148 so the heads 138 may be removed from the tubes 32, 34 or 28, 30, as the case may be. The jack may then be transferred to a position adjacent other bars 52A and/or 54A to complete the assembly.

The jigs 130 may be of any suitable construction which is collapsible in a manner to permit removal from the finished leg. Also when such jigs are in place they space the tubes 28—40 substantially in, or slightly less than, the correct position. For example, such jigs may be made of a plurality of parallel planks 154, 156 and 158 of wood, plastic or the like held side by side by bolts 160 which have bolt heads 162 and nuts 164, which bolts may be inserted for assembly of the jigs and removed for collapsing and removing the jigs after the leg has been assembled.

The plank 156 has brackets 166 secured thereto at each end by bolts 168. The brackets 166 have holes to receive the U-bolts which pass around the particular pipes being held such as pipes 32 and 34. The springs 170 and nuts 172 are tightened sufficiently to bring the tubes 32 and 34 (or 28 and 30) against the ends 59 of the unadjustable bars 52B (or 54B) as the case may be. The planks 154 and 158 have similar brackets 174 and 176 to receive similar U-bolts 178, 180, springs 182, 184 and nuts 186, 188 to hold the other pair of opposed tubes, such as tubes 28 and 30.

In the particular instance illustrated, the tubes 32 and 34 are slightly spaced from the brackets 166 and plank 134 because the unadjustable bar 52B stops such tubes in such slightly spaced relation. The tubes 28 and 30 are held against the brackets 174 and 176 by the springs 182, 184 in a yielding manner so such tubes may be spread outwardly by the spreading means of FIGURE 16 to impart the correct tension on the bands 36, 38, 36a and 38a.

In assembly, the ends of the tubes 28—34, with their end plates 72, 78 (FIGURE 14), are temporarily secured to bolts in the temporary jig 190 to space the tubes in proper longitudinal relationship. The tubes 28—34 and the bars 52A, 54A, 52B, 54B are then properly spaced by the use of the jigs 130, with the bars 52A, 54A adjusted to a slightly shorter length than their final length. The bands 36—38a are then spirally wound as tightly as conveniently possible and are secured to the tubes 32—34 by the clamps 44. Then the respective tubes adjacent the ends of the bars 52A and 54A are serially or simultaneously spread apart by the heads 138 of the spreading means shown in FIGURE 16 to produce the correct tension on the bands 36, 38, 36a and 38a. The nuts 62 (and 64) of FIGURES 7 and 8, are then adjusted so the respective bars 52A and 54A snugly fit between such spread apart tubes. The spreading means are then released, and a final calibrating turn of the nuts 62 and 64 is given, if necessary, to provide the desired tension in the bands 36, 38, 36a and 38a. When all bars have been so adjusted, the spreading means of FIGURE 16 and jigs 130 and 190 are removed, and the leg is ready for installation.

Referring now particularly to FIGURES 20 through 44 inclusive, the tower shown in FIGURES 20 and 21 and 44 has a plurality, such as four, upwardly directed legs 210, 211, 212, and 213. These legs have their lower ends supported on footers 215 at the corners of a horizontal figure, which may be generally rectangular or square in shape, such as shown in FIGURE 44. The figure has a plurality, such as two pairs, of opposed sides C—C', and E—E'. The legs of opposed pairs of legs 210—211, and 212—213, respectively, extend upwardly from one pair of opposed sides C and C', respectively, of the figure shown in FIGURE 44, and gradually converge upward toward each other, as shown in FIGURE 20, substantially to the upper ends of said legs. The legs of opposed pairs of legs 210—212, and 211—213, which extend upwardly from the other pair of opposed sides E and E', respectively, of FIGURE 44 gradually converge upwardly toward each other, as shown in FIGURE 21, to a zone 217 intermediate the ends of the legs 210 through 213. These pairs of legs preferably are parallel to each other in the zone 217 for a desired vertical distance and are secured together at the zone 217. These pairs of legs then gradually diverge from each other, as shown at 219 in FIGURE 21, substantially to the upper ends of the legs.

The legs 210 through 213 may have any or all of the features, which are applicable, and which were described in connection with FIGURES 1 through 19. Conversely, any or all of the features shown and described in connection with FIGURES 20 through 44 may be used, where applicable, in connection with FIGURES 1 through 19 inclusive.

The legs 210 through 213 may be secured to each other at the zone 217 in any suitable manner. For example, they may be secured together by means of bands 221 and 223, FIGURE 24, which are wrapped around and clamped to the legs at the lower and upper limits of the zone 217. The bands 221 and 223 may be additional to, or may be part of, the transmission line supports 231, 233, 235, and 237 which are shown in FIGURE 20. For example, the band 221 may be additional to and adjacent to the lower support arm members 239 and 241 which are shown in FIGURES 20, 21, 22 and 23. However, the bands 221 and 222 are not illustrated in FIGURES 20, 21 and 22 to avoid confusion and crowding of lines.

Wherever applicable, the tubular members or rods heretofore or hereafter described may be attached together by clamping means substantially as shown in FIGURES 34, 35, and 36 wherever such rods or tubes are adjacent each other and cross near each other. Similar clamps may be provided wherever desired, wherever such tubes or rods are adjacent each other in parallel relationship, as is obvious. Further details of these clamps are later described.

The legs 210, 211, 212, and 213 may be substantially the same as the legs 15 heretofore described and may include the plurality of upright aluminum support or tubular members or tubes 28, 30, 32 and 34 heretofore described. Also they may include the two pairs of aluminum tension members or bands 36, 38, 36a and 38a wound in opposed spirals circling around each other and around the outer parts of the outer surfaces of the tubes 28, 30, 32 and 34. The clamping plates 44 may be applied at the intersections similar to 40 and 42 heretofore described. Also diagonal cross bars or tubes, such as 52 and 54, may extend between the tubes 32 and 34 and the tubes 28 and 30 respectively. Means for adjusting the length of the bars or tubes 52 and/or 54 may be provided of the same character as previously described in connection with FIGURES 1 to 19 inclusive and also as disclosed in FIGURES 31, 32, and 33, which will be more fully described, and which features of FIGURES 31, 32, and 33 may conversely be applicable to the embodiments of FIGURES 1 to 19 inclusive. The means for adjusting the length of the bars or tubes 52 and 54 may be provided for every cross bar, or may be provided only for such cross bars as are required to adjust the tension of substantially each span of the tension members 36, 38, 36a and 38a between each of the upright tubes or upright support members 28, 30, 32 and 34. In FIGURES 31 and 32 and 33 the opposed upright tubular members 232 and 235 may be emblematic of the support tubes 32 and 34, or the support tubes 28 and 30 of the various towers herein disclosed. Likewise the diagonal cross bars or tubes 252 may be emblematic and may be substituted for any of the diagonal cross bars or tubes 52 and 54 herein described.

In FIGURE 31 the adjustable end of the tube 252 is shown. This may include a sleeve nut 240. The sleeve nut 240 may have a hexagonal head 242. A bolt 244 has a threaded engagement with interior of the nut 240 at one end, and has its other end 246 cut to the radius of the tube 232 to provide a large bearing surface. The bolt 244 is pinched at 248 at any desired number of places around the circumference of the bolt 244. The bolt 244 is driven into the tube 232 at a proper opening in tube 232 initially, or may be driven by the extension movement caused by the turning of the hex head 242 from the dotted line position 242a to the full line position 242. At the full line position the cross bar 252 has imparted the required tension to the bands 36, 38, 36a, 38a, in a manner similar to that described previously in connection with FIGURES 1–19.

FIGURES 32 and 33 show the other end of the bar 252 which is shown in FIGURE 31, or it may be the end of a diagonal cross bar which has no longitudinal adjustment at either end, in which case the construction shown in FIGURES 32 and 33 may be provided at both ends of such unadjustable bar. The tube 252 of FIGURE 32 has a cup 248 snugly fitting therein, which cup 248 has a flange 250 which prevents any further inward movement of the cup 248 within the tube 252. In addition, the cup 248 has a bottom 254 to arrest inward movement of the tube 256 beyond the selected distance. The tube 256 extends into the support tube 235 and bears against the other part of the wall of tube 235 with a rounded end 257, with a large bearing surface which is diagonally opposite from the opening 258, in a manner similar to end 246 of bolt 244 in FIGURE 31. The other end 260 of the tube 256 extends from the opening 258 a distance slightly more than the depth of the cup 248 from the outer edge of its flange 250 to the bottom 254, to insure the tightness of the tube 256 within the support tube 235. For example, if the end 260 extends ⅞ inch out of the opening 258, then the said depth of the cup 248 may be ¾ inch. In this manner the thrust of bar or tube 252 is taken up by the bottom 254 of the cup 248, and by the other end 257 of the tube 256 acting upon the inside of the wall of support tube 235.

The typical clamp shown in FIGURES 34, 35, and 36 may be applied to a tube or rod 262 and a tube or rod 264, which tubes 262 and 264 are typical of all tubes or rods herein disclosed. These tubes or rods 262, 264 may cross each other at right angles or at any other angle with respect to each other, or may be parallel to each other. The clamp may include a plurality, such as two, U-bolts 266, with flattened U-portions. The bolts 266 engage at their ends the arc-shaped bracket 268, which is held by the nuts 270. A metal pad 272, of the shape shown in FIGURES 35 and 36, may be placed between the tubes 262 and 264 before applying the clamping action. The wings 272a may have an arc 274 for the reception of the tube 264 therein, when the tubes cross at an angle to each other. FIGURES 35 and 36 are enlarged with respect to the FIGURE 34, as is obvious. When the rods or tubes 262 and 264 are parallel, the pad 272 may be omitted or may be a semi-circular sleeve.

Another embodiment of footer plate construction is shown in FIGURES 37 to 41 inclusive. A plurality, such as four, base plates 280 may be secured by bolts 84 similar to bolts 84 heretofore described, in connection with FIGURE 14 which are embedded in the footers 215 (or any of the footers herein shown). The bolts 84 may pass through the bolt openings 282, and nuts similar to nuts 88 may then clamp the base plate 280 directly to the footer, 215, or with an interposed shim, if desired. The base plate 282 has an upwardly and outwardly flaring tubular extension 284, which is relatively rigid.

As shown in FIGURES 39–41, the lower ends 286 of any of the support tubes 28, 30, 32 and 34 herein described may be split at a plurality of positions 288, such as on four equally spaced positions around the circumference. This provides a lower split end which may be placed over and surround the tubular extension 284 of FIGURE 37. The clamping band 290 may be placed around the lower end 286 of any of the said upright or vertically directed support tubes. The band 290 is correspondingly flared to the flared extension 284. The compressible clamp 290 may be compressed by the bolt construction 292, which passes through the openings 294 in the clamp 290, inwardly to flare the end 286 of any of the support tubes in a manner tightly to lock such tube to the base plate 280.

Suitable cross bracing rods 296 may be provided between the footers 215 and the legs 210 to 213 inclusive, as shown in FIGURES 20, 21, 28, 29 and 42 to 44 inclusive. The cross bracing rods 296 may be attached to the footers 215 and to the intermediate parts of the legs 210 to 213. For example, strong horizontal tubes 298, FIGURES 20, 21 and 29 are secured to certain of the vertically disposed support members 28, 30, 32, and 34. For example, U-bolts 300, FIGURES 28, and 29, with flat engaging surfaces at the center of the U, have brackets 302 secured thereto by nuts 304. The ends of the tubes 298 are flattened at 306 and are secured to the horizontal portions of the bracket 302. The bracing rods 296 have their ends 307 similarly secured to the horizontal portions of the bracket 302. The bracing rods 296 may extend substantially along the dotted lines C—C' and E—E' of FIGURE 44. The lower ends of the rods 296 may be secured to the footers 215, for example, by means of the clevis constructions 308, which are shown in FIGURES 42 and 43, and in which the lower rod 310 is embedded in the footer 215. The upper sleeve 312 of the clevis construction has a threaded or other type of engagement with the lower ends of the rods 298. Turn buckles 314, FIGURES 20 and 21, are placed along the rods 296 to tighten them. The cross bracing has been indicated as extending along the sides of the legs 210 to 213. However, in addition, or alternatively, the cross bracing may extend diagonally at 296a, FIGURE 44, across the tower structure, as is evident.

In the case of the leg 210, typically illustrated in FIGURE 29 as applicable to all four legs, the upright tubes 28 and 30 may be secured to the horizontal tubes 298 by means of the clamp construction typically shown in FIGURES 34, 35, and 36 as will be apparent. One of horizontal tubes 298 of FIGURE 29 may continue to leg 211, and the other horizontal tube 298 of FIGURE 29 may continue to leg 212. Similar constructions occur at legs 211—213.

Figure 23:
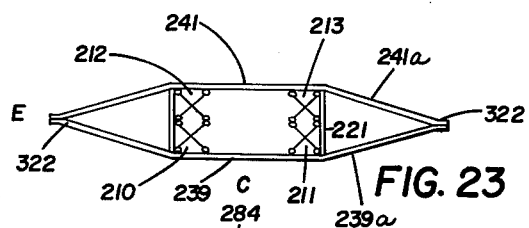
FIGURE 23 is a plan view of FIGURE 22 on reduced scale.
Figure 28:
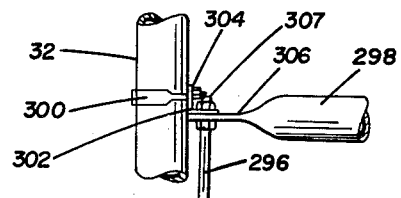

The power line supports 231, 233, 235 and 237 may be made of tubing properly bolted together and bolted to the leg structures, as indicated in FIGURES 20, 21, 22, 23, 24, and 27. For example, the lowest member of the support 231 may be made of bars or tubes 239 and 241, which are secured to the legs 210, 211, and 212, 213, respectively, as indicated in FIGURE 23. The bars 239 and 241 may converge as indicated at 241a and 239a. Upwardly diagonal tubes or bars 320 and 321 are connected at the converging points 322, in the manner shown in FIGURE 27, and intersect the upward support members 28, 30, 32 and 34 where they are attached at 234 by clamping members somewhat as shown in FIGURES 34, 35, and 36. All of these clamped intersections are indicated by the numerals 234 by way of convenience. Any suitable type of clamp may be used at these places, as is evident. The tubes or bars 320 and 321 continue upwardly in a slanting direction and then converge at the power line support intersections 340, FIGURE 20.

If desired, the diameter of the supporting tubular members 28, 30, 32, and 34 may be reduced along the upward extent of the legs as indicated at 342, FIGURE 22, where eccentric reducers with clamps at each end, not shown, may be provided to receive the somewhat smaller diameter upright members 28a, 30a, 32a, and 34a.

Figure 27:
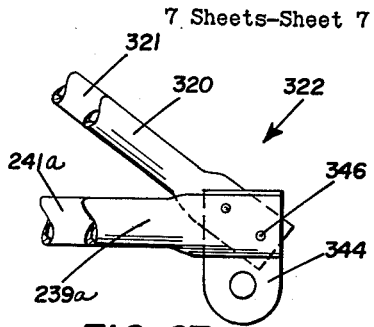
FIGURE 27 is an enlarged detail at the juncture of certain members at the point 227 in FIGURE 20.

At any of these intersections, 322, 340, 341 and 343, the intersecting pipes, tubes or rods, as indicated in FIGURE 27, may be flattened and a bracket 344 may be bolted at 346 to the members 320, 239a, 241a, or similar intersecting members. The bracket 344 has an opening 345 to which the power line insulators 350 are attached.

The construction at the line supports 235 and 237 may be substantially the same as previously described in connection with supports 231 and 233, as is evident from the illustrations in FIGURES 20 and 21, and are not further described. Suitable power line insulators 350 may be suspended at the intersections, from brackets 344, and ground wires, not shown, may be supported above the line support 237 in a well known manner.

In FIGURE 25, the ends 352 of the vertical supporting members, 30a and 32a for example, converge to the point 353 where they are flattened together and are attached to the flattened end of supporting members 356 and they are bolted together at 358 to provide an upper structure 237 where the ground lines may be supported by upwardly directed line holders, well known in the art.

FIGURE 26 transversely and typically shows details of the intersection at all of the points similar to point 226 of FIGURE 20. For example, assuming that upright support members 28a and 32a converge at the point 226, their upper ends may be flattened at 360 and may be bolted together at 362 with a right angled bracket 363. If tension bands 36 and 38 happen to intersect at this point, they are secured to the bracket 363 and do not turn, but continue in the same plane until they intersect the upright supports 28a and 32a of legs 211 and 210 respectively. Above this point 226 the tension bands may be widely spaced apart, as shown in FIGURE 20, or may maintain the original spacing as shown in FIGURE 21. If any tension band, for example 36a, is to terminate at this point 226, the end of band 36a may be bolted at 364 to the bracket 363. Special cross-bars or tubes 366 may extend to the similar point on the other side of the tower from that shown in FIGURE 20 properly to space the upright support members 28a, 30a, 32a, and 34a which happen to terminate at these points 226. These compression cross-bars or tubes 366 may be flattened at 368 and may be bolted by separate bolts or by the bolts 364.

The following sizes are given by way of example, and not by way of limitation. In the tower of FIGURES 20 and 21, the legs 210 to 213 may be 20 feet apart between the centers of the legs at the footers 215. The distance from top footer level to the horizontal members 356 may be 90 feet. The distance from top footer level to members 298 may be 30 feet and the distance from top footer level to the horizontal members 239 and 241 may be 60 feet. From there it may be 12 feet to the members 340. From there it may be 12 feet to members 360 and 6 feet to the upper members 356.

The type structure of FIGURES 20 and 21 is a major design advantage to the tower for the reason that by converging the two main component legs at the zone 217 approximately ⅔ the height of the tower, the $L/R$ of the entire tower is greatly reduced. This is because the factor $L$, which is the maximum vertical unsupported height, is reduced by ⅓. Thus, the ratio $L/R$ is reduced. This $L/R$ reduction tremendously reduces the thickness and physical size of the tower leg components of the entire tower from the zero elevation to the point of convergence, which is approximately ⅔ of the way up the tower. Also resistance to torsional forces is greatly reduced because the torsional moments are reduced.

The triangular structure composed of two A-frames as viewed in FIGURE 21 which meet and are anchored together at the sixty-foot level and then flare outward again at the sixty-six foot level, in the example given, is a much stronger type of structure. An important advantage of this structure is its ability to resist horizontal loads through axial tension and compression with a minimum of bending. In other words, these stresses now run parallel to the major tower legs, thus eliminating horizontal and vertical components. This, of course, gives maximum strength with minimum material. Also resistance to torsional loads due to a single broken conductor is greatly increased because torsional moments at the sixty-foot lever have been reduced to a minimum.

This application is a continuation-in-part of my copending application Serial Number 786,636, filed January 13, 1959, for Aluminum Transmission Tower, now abandoned.

While the form of the invention now preferred has been disclosed in accordance with the requirement of the statutes, other forms may be used, all coming within the scope of the claims which follow.

I claim:
1. An aluminum tower leg comprising: two pairs of diagonally opposed, upright, aluminum support members arranged in diamond cross-sectional relationship; four aluminum bands wound in opposed spirals partly circling around the outer part of the outer surface of said support members and intersecting each other at intervals to form intersections with each other and with said support members, the intersections with one pair of opposed support members being in vertical staggered relationship with the intersections with the other pair of support members; diagonal cross-bars between said opposed support members located adjacent said intersections; and means for adjusting the length of some of said cross-bars to tension substantially all of the spans of said bands between said intersections.

2. An aluminum tower leg comprising: a plurality of upright aluminum support members in spaced relationship; continuous linear aluminum tension members wound in opposed spirals turning around the outer part of the surface of said support members and intersecting each other at frequent intervals to form intersections with each other and with said support members, and to form spans between said intersections; cross-bars between said support members; and means for adjusting the length of some of said cross-bars to adjust the tension of substantially each span of said tension members.

3. A tower leg according to claim 1 in which the support members converge toward each other.

4. A tower leg comprising: a plurality of pairs of diagonally opposed, upright support members arranged in multisided cross-sectional relationship; a plurality of pairs of bands wound in spirals partly circling around the outer part of the outer surface of said support members and intersecting each other at intervals to form intersections with each other and with said support members, the intersections with one pair of opposed support members being in vertical staggered relationship with the intersections with other pairs of support members; diagonal cross-bars between said opposed support members located adjacent said intersections; and means for adjusting the length of some of said cross-bars to tension substantially all of the spans of said bands between said intersections.

5. A tower leg according to claim 2 in which the support members converge toward each other upwardly for part of the height of the tower leg.

6. A tower leg according to claim 1 in which means are provided for securing said bands at said intersections to said support members.

7. A tower leg according to claim 2 in which means are provided for securing said tension members to said support members where they turn around said support members.

8. A tower leg according to claim 4 in which means are provided for securing said bands at said intersections to said support members.

References Cited in the file of this patent

UNITED STATES PATENTS

| | | |
|---|---|---|
| 637,420 | Robbins | Nov. 21, 1899 |
| 642,588 | Davis | Feb. 6, 1900 |
| 742,755 | Uffelman | Oct. 27, 1903 |
| 1,013,489 | Haskell | Jan. 2, 1912 |
| 1,101,084 | McCarty | June 23, 1914 |
| 1,215,061 | Rice et al. | Feb. 6, 1917 |
| 1,409,089 | Fitch | Mar. 7, 1922 |
| 1,685,716 | Mullen | Sept. 25, 1928 |
| 1,764,182 | Rawson | June 17, 1930 |
| 1,770,932 | Leake | July 22, 1930 |

FOREIGN PATENTS

| | | |
|---|---|---|
| 1,011,157 | France | Apr. 2, 1952 |
| 1,024,137 | France | Jan. 7, 1953 |